United States Patent
Ayyappanpillai et al.

(10) Patent No.: US 9,012,688 B2
(45) Date of Patent: Apr. 21, 2015

(54) FLUORESCENT MATERIAL FOR SELF-ERASABLE WRITING, AUTHENTIC SECURITY LABELING, CURRENCY COUNTERFEIT PREVENTION AND PROCESSES FOR THE PREPARATION THEREOF

(75) Inventors: Ajayaghosh Ayyappanpillai, Kerala (IN); Thirumalai Kumaran Rajasekaran, Kerala (IN)

(73) Assignee: Council of Scientific and Industrial Research (IN)

( * ) Notice: Subject to any disclaimer, the term of this patent is extended or adjusted under 35 U.S.C. 154(b) by 169 days.

(21) Appl. No.: 13/571,763

(22) Filed: Aug. 10, 2012

(65) Prior Publication Data

US 2013/0209665 A1    Aug. 15, 2013

(30) Foreign Application Priority Data

Aug. 12, 2011   (IN) ............................ 2294/DEL/2011

(51) Int. Cl.
  C07C 233/65     (2006.01)
  C09D 11/17      (2014.01)
  C09D 11/50      (2014.01)

(52) U.S. Cl.
  CPC .............. C09D 11/50 (2013.01); C09D 11/17 (2013.01)

(58) Field of Classification Search
  CPC ..... C07C 233/176; C07D 11/17; C07D 11/50
  USPC ....................................................... 564/176
  See application file for complete search history.

(56) References Cited

U.S. PATENT DOCUMENTS

| | | | |
|---|---|---|---|
| 3,330,866 A * | 7/1967 | Schmidt | 564/176 |
| 3,618,765 A | 11/1971 | Cooper | |
| 5,662,735 A | 9/1997 | Pifferi | |
| 5,757,001 A | 5/1998 | Burns | |
| 7,315,876 B2 | 1/2008 | Landolt | |
| 2010/0328410 A1 | 12/2010 | Grzybowski et al. | |

OTHER PUBLICATIONS

Srinivasan et al, J. Am. Chem. Soc., 2009, 131, 15122.*
Ge, Jianping, et al., "Rewritable Photonic Paper with Hygroscopic Salt Solution as Ink", *Adv. Mater.*, 21(42), (2009), 4259-4264.
Kishimura, Akihro, et al., "Rewritable phosphorescent paper by the control of competing kinetic and thermodynamic self-assembling events", *Nature Materials*. 4 (7), (Jul. 2005), 546-549.
Klajn, Rafal, et al., Writing Self-Erasing Images using Metastable Nanoparticle "Inks ", *Angew. Chem. Int. Ed.*, 48 (38), (2009), 7035-7039.
Kunzelman, Jill, et al., "Self-assembly of chrornogenic dyes—a new mechanism for humidity sensors", *J. Mater. Chem.*, 17, (2007), 2989-2991.
Yoon, Seong-Jun, et al., "Multistimuli Two-Color Luminescence Switching via Different Slip-Stacking of Highly Fluorescent Molecular Sheets", *J. Am, Chem. Soc.*, 132(39), (2010), 13675-13683.
Zhang, Guoqing, et al., "Polymorphism and Reversible Mechanochromic Luminescence for Solid-State Difluoroboron Avobenzone", *J. Am. Chem. Soc.* 132, (2010), 2160-2162.

* cited by examiner

*Primary Examiner* — Shailendra Kumar
(74) *Attorney, Agent, or Firm* — Schwegman Lundberg & Woessner, P.A.

(57) ABSTRACT

The present invention provides a novel fluorescent molecule having formula 1 which exhibit emission color change when in contact with moisture useful for the preparation of fluorescent paper, allowing self-erasable writing, security label for document authenticity, check and prevention of currency counterfeit. Compound of formula 1, when coated on paper, results in blue emitting surfaces on which writing is possible using water as ink. The images undergo self-erasal after 6 hours making the paper reusable or instantly with hot air. The images are visible only on illumination with a UV lamp having wavelength 365 nm. The material can be coated on any document to create security label which changes color on touching with a wet surface or water pen and will go back to the native color when the moisture is dried off after a time frame.

5 Claims, 7 Drawing Sheets
(5 of 7 Drawing Sheet(s) Filed in Color)

FIG. 12
Scheme 1

FLUORESCENT MATERIAL FOR SELF-ERASABLE WRITING, AUTHENTIC SECURITY LABELING, CURRENCY COUNTERFEIT PREVENTION AND PROCESSES FOR THE PREPARATION THEREOF

CLAIM OF PRIORITY

This application claims the benefit of priority under 35 U.S.C. §119 of Indian Patent Application Serial Number 2294/DEL/2011, entitled "FLUORESCENT MATERIAL FOR SELF-ERASABLE WRITING, AUTHENTIC SECURITY LABELING, CURRENCY COUNTERFEIT PREVENTION AND PROCESSES FOR THE PREPARATION THEREOF," filed on Aug. 12, 2011, the benefit of priority of which is claimed hereby, and which is incorporated by reference herein in its entirety.

FIELD OF THE INVENTION

The present invention relates to fluorescent material useful for self-erasable writing, authentic security labeling, currency counterfeit prevention and processes for the preparation thereof.

More particularly, the present invention relates to the process for the preparation of a fluorescent molecule having general formula 1 which can be used for hand written self-erasable images using water as ink which has application in currency counterfeit prevention, detection and alert. The present invention also relates to a process for the preparation of fluorescent papers for writing and preparation of security labels for checking authenticity of important documents such as visa.

BACKGROUND OF THE INVENTION

Reference may be made to moisture sensitive materials based on fluorescent molecules wherein this type of materials can be used to sense moisture by monitoring their optical changes. J. Kunzelman, B. R. Crenshaw, C. Weder, *J. Mater. Chem.* 2007, 17, 2989. The drawbacks are fluorescence of the film is quenched and the process is irreversible.

Reference may be made to U.S. Pat. No. 3,618,765 wherein currency counterfeit detector is used to detect the chromamorphic response and magnetic characteristics of US paper currency. The drawback of this invention is the counterfeit also incorporates the chromamorphic response and magnetic characteristics.

Reference may be made to U.S. Pat. No. 5,662,735 wherein chemical solution containing iodine is used to detect currency counterfeit. The drawback of this invention is the counterfeit also incorporates this property of chemical solution of iodine and thereby making it difficult to differentiate from the genuine currency.

Reference may be made to U.S. Pat. No. 5,757,001 wherein detecting currency counterfeit by measuring the reflectance of near infrared beams and comparing the reflectance values with those from genuine currency. The drawback of this invention is the property of reflectance of near infrared beams can be incorporated to fake currency making it difficult to differentiate from genuine currency.

Reference may be made to self-erasable and rewritable materials in which information is written over metastable nanoparticle "inks" wherein these materials can be useful for storing sensitive or temporary information are known from the work of R. Klajn, P. J. Wesson, K. J. M. Bishop, and B. A. Grzybowski, *Angew. Chem. Int. Ed.* 2009, 48, 7035 and US patent 20100328410A1. The drawbacks are written images are visible in normal day light and light of certain wave length is used to write the images.

Reference may be made to U.S. Pat. No. 7,315,876 filed by Xerox Corporation wherein self-erasable printing paper allows recycling of paper by using a polymer incorporated photochromic molecule for printing on paper. The drawbacks of this invention are written images are visible to eyes under normal light and images are printed on paper using light of certain wave length.

Reference may be made to rewritable photonic paper with hygroscopic salt solution as ink was made by J. Ge, J. Goebi, L. He, Z. Lu, and Y. Yin *Adv. Mater.,* 2009, 21, 4259. The drawbacks of this invention are the writing made by the hygroscopic salt solution as ink is not self-erasable.

Reference may be made to rewritable phosphorescent paper by the control of competing kinetic and thermodynamic self-assembling events was made by A. Kishimura, T. Yamashita, K. Yamaguchi and T. Aida *Nature materials*, vol 4, July 2005. The drawbacks of this invention are writings made at particular temperature and erasable using different rate of temperature.

General formula 1

Reference may be made to mechanochromic fluorescent materials as a candidate for writing and imaging by G. Zhang, J. Lu, M. Sabat and C. L. Fraser, *J. Am. Chem. Soc.* 2010, 132, 2160 and S. J. Yoon, J. W. Chung, J. Gierschner, K. S. Kim, M. G. Choi, D. Kim and S. Y. Park, *J. Am. Chem. Soc.* 2010, 132, 13675. The drawbacks of this invention are writings made by applying force and reusability can be done using thermal annealing or exposing to solvent vapors.

Reference may be made to Oligo (p-phenylenevinylene) derivatives that are known to form self-assembled structures in polystyrene matrix which change the fluorescence from green to blue upon heating and hence is useful for thermal imaging by S. Srinivasan, P. A. Babu, S. Mahesh, and A. Ajayaghosh *J. Am. Chem. Soc.* 2009, 131, 15122. The drawbacks are writings are made using thermal pen which is not friendly to use and written images are not self-erasable.

However as evident from above references self-erasable hand writing using water as an ink is unknown, the fluorescent compound having formula 1 that changes fluorescence color when in contact with water is not known, use of formula 1 for security application is not known.

OBJECTIVES OF THE INVENTION

The main object of the present invention is to provide a fluorescent material for self-erasable writing, authentic security labeling, currency counterfeit prevention and processes for the preparation thereof which obviates the drawbacks as detailed above.

Another objective of the present invention is to provide a process for the preparation of fluorescent molecule having formula 1.

Yet another objective of the present invention is to use water as an ink for writing.

Yet another objective of the present invention is to prepare a rewritable paper in which the written information is invisible under normal light and can be read only under light with 365 nm wavelength.

Yet another objective of the present invention is to provide a fluorescent security label for documents.

Still another objective of the present invention is to detect, prevent and a currency counterfeit by fluorescence color change in contact with water.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

SUMMARY OF THE INVENTION

Accordingly, present invention provides compound of general formula 1

General Formula 1 wherein

R =

In an embodiment of the present invention, said compound is useful as fluorescent material for self-erasable writing, authentic security labeling, currency counterfeit prevention.

In another embodiment, present invention provides a process for the preparation of compound of general formula 1 comprising the steps of:
  i. refluxing compound 3 with compound 2 in tetrahydrofuran and triethylamine in the ratio ranging between 1:1 to 1:1.5 in the presence of catalyst at temperature in the range of 55 to 65° C. for period in the range of 11 to 13 h under argon atmosphere;

3

2 ii. cooling the reaction mixture as obtained in step (i) at temperature in the range of 25 to 30° C. followed by extracting using chloroform to obtain combined organic layer;
  iii. washing the combined organic layer as Obtained in step (ii) with water, brine followed by drying over anhydrous sodium sulphate and purifying using column chromatography with 10% methanol-chloroform as eluent to obtain compound of general formula 1.

In yet another embodiment of the present invention catalyst used in step (i) are 5 to 10 mol % Bis(triphenylphosphine) palladium(II) chloride [$PdCl_2(PPh_3)_2$] and 5 to 10 mol % Copper iodide (CuI).

In yet another embodiment of the present invention, yield of the compound of general formula 1 is in the range of 72-75%.

In yet another embodiment, present invention provides a process for the preparation of fluorescent material/paper for self-erasable writing by using compound of formula 1 comprising the steps of:
a) dissolving 0.1 to 0.2 wt % compound of formula 1 in chloroform under gentle heating at a temperature in the range of 35 to 45° C. to obtain a solution;
b) spraying the solution as obtained in step (a) over strip of a paper and dried under vacuum to obtain fluorescent material/paper.

In yet another embodiment of the present invention, said fluorescent papers coated with compound having formula 1 changes the fluorescence color from blue to green upon spraying or touching with water over it.

In yet another embodiment of the present invention, said fluorescent papers coated with compound having formula 1 are useful for self-erasable writing using water as ink for writing over it.

In yet another embodiment of the present invention, said fluorescent papers coated with compound having formula 1 self-erases the temporary data in four to six hours and abruptly when exposed to hot air.

In yet another embodiment of the present invention, temporary data written over the fluorescent papers coated with compound having formula 1 is invisible under normal light.

DETAILED DESCRIPTION OF THE INVENTION

Present invention provides a fluorescent material for self-erasable writing, authentic security labeling, currency counterfeit prevention and processes for the preparation thereof which comprises of synthesis of novel fluorescent molecule 3,4,5-tris(2-(2-(2-methoxyethoxy)ethoxy)ethoxy)-N-(4-((4-phenylethynyl)phenyl)ethynyl)phenyl)benzamide oligo(p-phenyleneethynylene) (OPE) represented by formula 1 and coating using formula 1 for self-erasable writing, security labeling and for detection, alert and prevention of currency counterfeit by dissolving the compound having formula 1 in chloroform and coating over the paper followed by water spray, writing with water and applying moisture which is then exposed to ultra violet light having wave length 365 nm which displays blue fluorescence in the absence of water or moisture and changes to green fluorescence in the presence of water and remain invisible under normal light.

Figure 1:
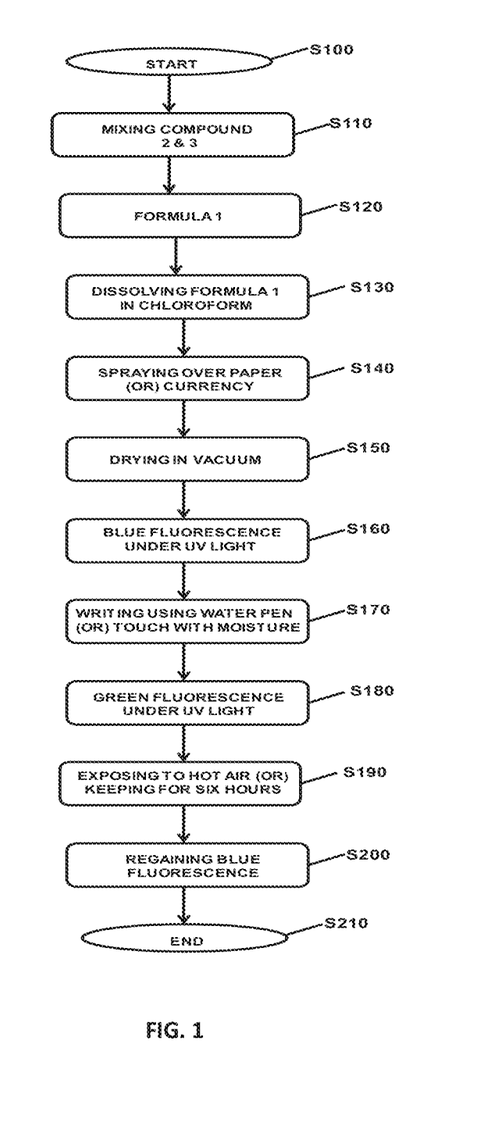
FIG. 1 represents flow chart illustrating the entire processes involved in this work.

FIG. 1 shows flow chart illustrating all the processes involved in this work. According to various exemplary embodiments the processes start from step S100 and continues to step 110, during which formula 1 is synthesized using compound 2 and compound 3 following scheme 1, shown in FIG. 12. Next, process continues to step S120, during which formula 1 is characterized using various techniques such as UV, FT-IR, $^1$H NMR, $^{13}$C NNW and HRMS. Next, process continues to step S130, during which 3 mg of formula 1 is dissolved in 2 ml of chloroform. Next, process continues to step S140, during which the chloroform solution of formula 1 is sprayed over paper or currency. Next, process continues to step S150, during which the substrate is dried under vacuum. Next, process continues to step S160, during which the substrate is illuminated using ultraviolet light of wavelength 365 nm. Next, process continues to step S170, during which writing using water pen or touch it with moisture above the substrate can be made. Next, process continues to step S180, during which the substrate shows green color fluorescence for moisture spread regions. Next, process continues to step S190, during which the substrate is exposed to hot air or keeping at room temperature for six hours. Next, process continues to step S200, during which the substrate shows blue fluorescence under ultraviolet light of wavelength 365 nm. Next, process finally continues to step S210, during which processes end.

The present invention provides a process for the synthesis of novel fluorescent molecule having formula 1, the said process comprising the steps of:
Refluxing compound 3 (1 equivalent) with compound 2 (1.2 equivalents) in tetrahydrofuran (dry, 10 equivalents) and triethylamine (dry, 10 equivalents) in the presence of catalyst $PdCl_2(PPh_3)_2$ and CuI at 60° C. for 12 h under argon atmosphere. After cooling to room temperature (25° C.) the reaction mixture was extracted using chloroform. The combined organic layer was washed with water, brine and dried over anhydrous sodium sulphate and purified using column chromatography with 10% methanol-chloroform as eluent to give formula 1 in 75% yield and characterized by FT-IR, UV, $^1$H NMR, $^{13}$C NMR and HRMS.

The present invention provides a process for the preparation of rewritable paper for temporary writing, the said process comprising the steps of:
Preparing a solution of the molecule by dissolving 3 mg of the molecule in 2 ml of chloroform followed by gentle heating between 35° C. to 45° C. and spraying the solution obtained on a paper and dried under vacuum. The paper is blank in normal light conditions. The paper coated with molecule having formula 1 is exposed to Ultra-violet light of wavelength 365 nm. The paper showed blue fluorescence. Moisture is applied on paper and again it is exposed to Ultraviolet light of wavelength 365 nm wherein paper showed green fluorescence. The green fluorescence remained on the paper for six hours and the fluorescence changed from green to blue instantly when the paper was exposed to hot air.

Figure 2:
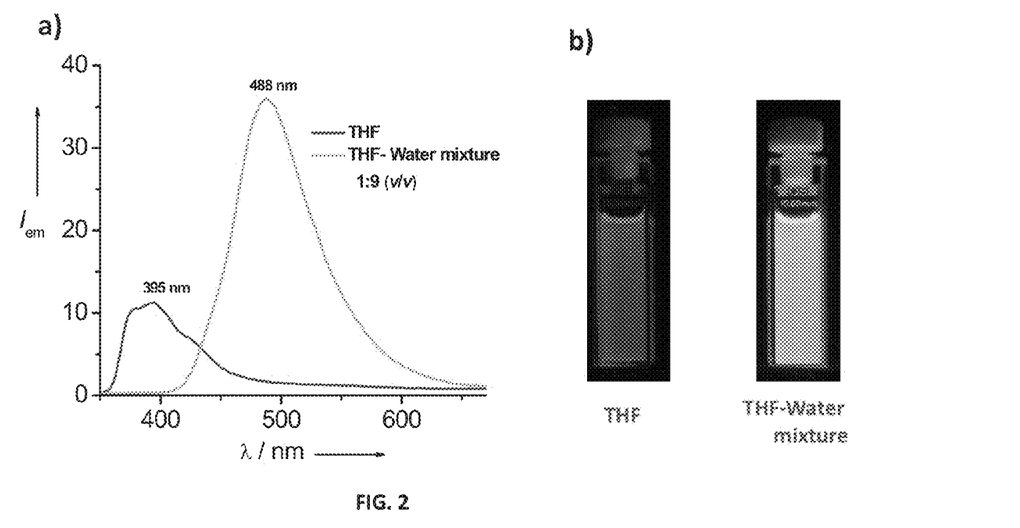
FIG. 2a) Shows the emission spectra of OPE formula 1 in monomer state (THF) and aggregated state (THF-Water mixture) at $1 \times 10^{-5}$ M concentration. Excitation wavelength 340 nm.
FIG. 2b) Shows the photograph of OPE formula 1 in monomer state (left) and aggregated state (right) under UV light.
Figure 3:
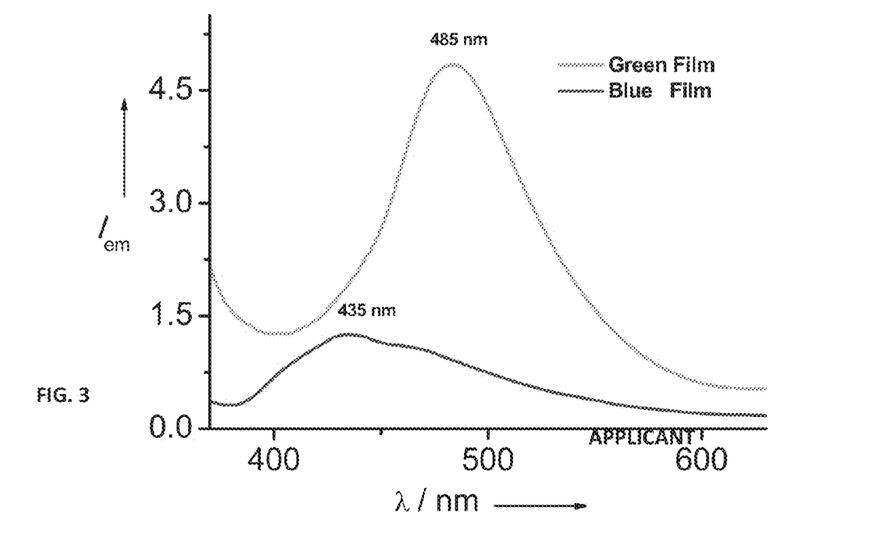
FIG. 3 shows emission spectra of thin film a) before and b) after spraying water above it. Excitation wavelength is 340 nm.
Figure 4:
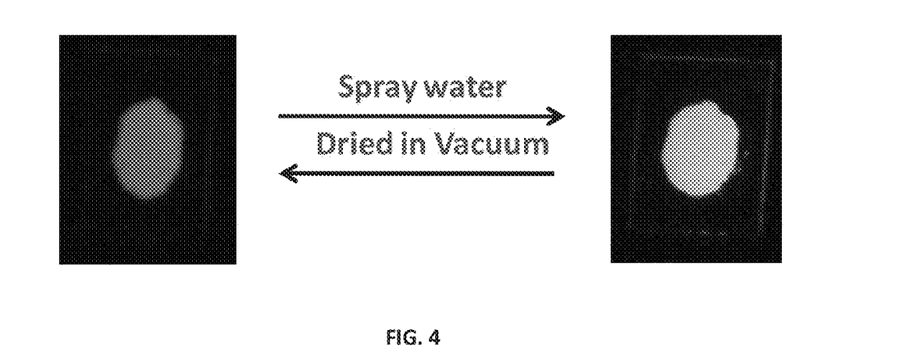
FIG. 4 shows optical characterization of thin film: Photograph of thin film with blue (left) and green (right) fluorescence under UV light.
Figure 5:
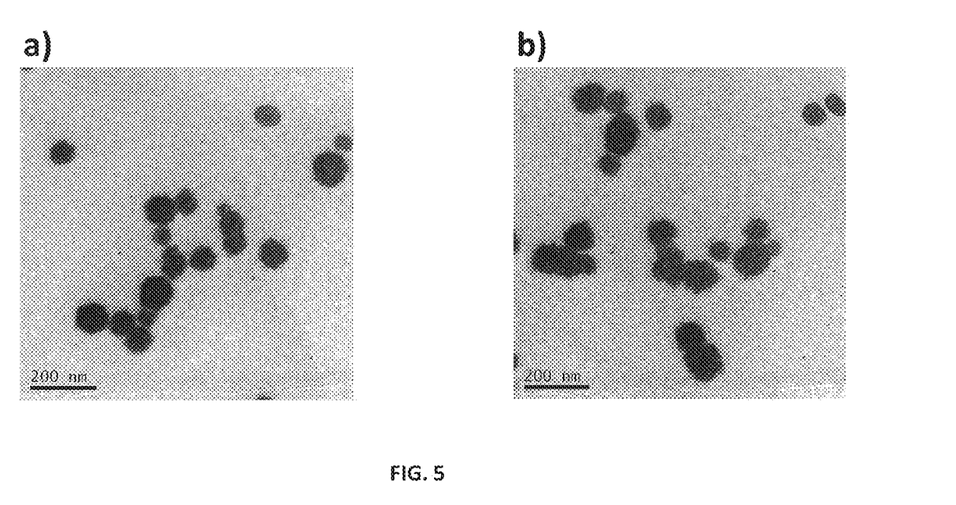
FIGS. 5A and 5B show transmission electron microscopic (TEM) image of formula 1 in THF-Water (1:9) mixture at $5 \times 10^{-5}$ M concentration.
Figure 6:
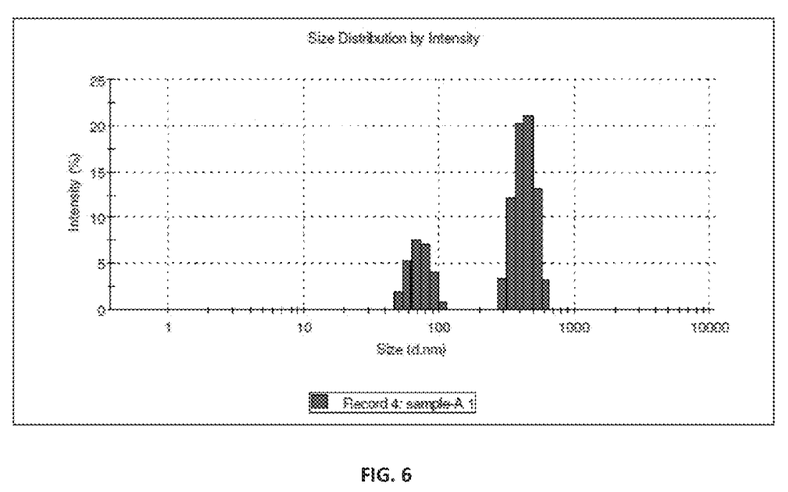
FIG. 6 shows dynamic light scattering analysis of spherical aggregates with different size in THF-Water mixture.

The transmission electron microscopic (TEM) image of formula 1 at 5×10 M concentration in presence of 1:9 THF-Water mixtures showed the formation of spherical particles as shown in FIGS. 5A-B which is the aggregation of formula 1 in water to give the fluorescence change. The dynamic light scattering (DLS) experiment showed the spherical nature of the particle of formula 1 with different size as shown in FIG. 6. FIGS. 2A-B correspond to emission changes of formula 1 with THE and THE-water mixture. The compound having formula 1 forms aggregates in the presence of water or moisture which causes fluorescence to change from blue to green. In the absence of water or moisture the compound having formula 1 will not form aggregates and shows blue fluorescence.

Most of the self-erasable writings are visible under normal day light. In case of security reasons if one needs to hide the written information and do not want anyone to photocopy the information, it should be invisible to eyes in normal day light and should be visible only with the aid of certain light with particular wavelength. Moreover the erasable recording medium should be fluorescent to prevent photocopy. The present invention satisfies all the above requirements i.e. the writings are self-erasable, water can be used as ink for writing, writings are visible only under illumination with an ultra violet lamp, high contrast and color difference between the written and non written parts and instant erasal of the writing with hot air if required.

A novel fluorescent molecule having formula 1 is synthesized and the moisture responsive property of formula 1 of the current invention could be used in number of applications. More particularly it can be applied in fake money prevention, detection and alert. Since the fluorescent mark made from formula 1 change its fluorescence color upon exposure to moisture, it can be coated over the currency note. Upon spraying water on the above currency, it changes its fluorescence color and the fake one could not have any change. In this way the compound is highly useful to detect, alert and prevent the circulation of fake money.

The fluorescent paper made from formula 1 can be used to store temporary data. The secret data is written using pen containing water as ink. Written images can be self-erased within 6 hours or exposing the paper to hot air. The material described herein can be used optionally as rewritable papers were the repeated writing and rewriting is needed.

The fluorescent molecule having formula 1 can be used as a security label for checking and detecting the authenticity of important documents such as visa by virtue of its fluorescence color change from blue to green upon contact with moisture under UV light of wavelength 365 nm.

The self-erasable paper of the current invention uses pen containing water as ink. This technique is environmentally friendly and low cost.

The above are illustrative of various uses/applications of the invention. Again, the enumeration of the specific embodiments herein not to be taken as necessarily limiting on the other non-detailed uses/applications which comprise the self-erasable writing of the current invention. Those of skill in art will appreciate other possible application and uses of the above and methods herein.

EXAMPLES

The following examples are given by the way of illustration and therefore should not construe to limit the scope of the invention.

Example 1

Process for the Preparation of Compound of Formula 1

3,4,5-tris(2-(2-(2-methoxyethoxy)ethoxy)ethoxy)-N-(4-((4-phenylethynyl)phenyl)ethynyl)phenyl)benzamide oligo(p-phenyleneethynylene) (OPE)

Figure 12:
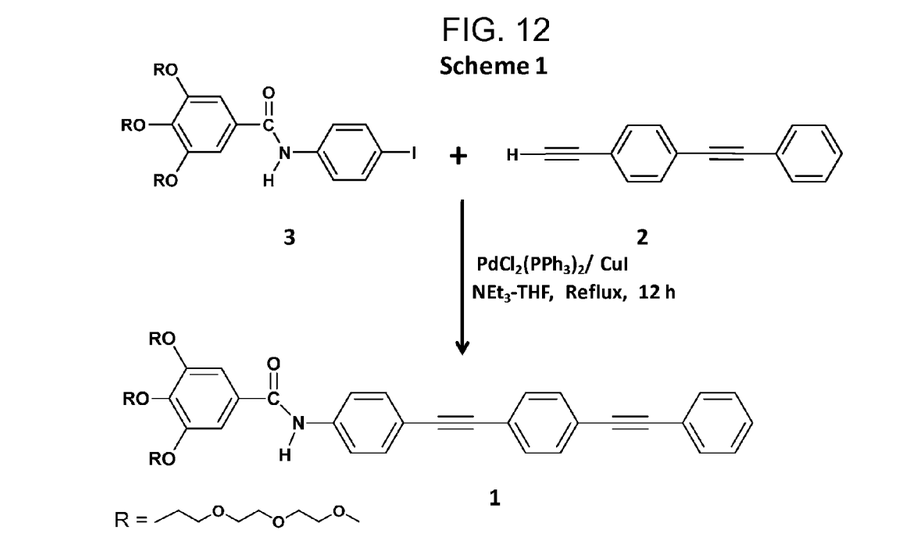
FIG. 12 shows Scheme 1, which represents process steps for the preparation of compound of formula 1.

Synthesis of compound of formula 1 was achieved as per scheme 1, shown in FIG. 12. It was prepared by refluxing compound 3 (1 equivalent, 500 mg) with compound 2 (1.2 equivalents, 150 mg) in tetrahydrofuran (dry, 10 ml) and triethylamine (dry, 10 ml) in the presence of catalyst $PdCl_2(PPh_3)_2$ (42 mg) and CuI (12 mg) at 60° C. for 12 h under argon atmosphere. After cooling to room temperature (25° C.) the reaction mixture was extracted using chloroform. The combined organic layer was washed with water, brine and dried over anhydrous sodium sulphate and purified using column chromatography with 10% methanol-chloroform as eluent to give compound of formula 1 in 75% yield and characterized by $^1H$ NMR, $^{13}C$ NMR and HRMS (High Resolution Mass Spectral).

i) FT-IR (KBr) $v_{max}$=1915, 2220, 2875, 3034, 3237, 3598 $cm^{-1}$.

ii) UV $\lambda_{max}$=335 nm.

iii) $^1H$ NMR (500 MHz, $CDCl_3$, TMS): δ=3.32 (s, 6H, $OCH_3$), 3.38 (s, 3H, $OCH_3$), 3.51-3.55 (m, 6H, $OCH_2$), 3.63-3.73 (m, 18H, OCH2), 3.79-3.85 (m, 6H, $OCH_2$), 4.23-4.25 (m, 6H, $OCH_2$), 7.25 (s, 2H, aromatic), 7.34-7.36 (m, 3H, aromatic), 7.51-7.55 (m, 8H, aromatic), 7.73 (d, 2H, aromatic), 8.64 (s, 1H, NH) ppm.

iv) $^{13}C$ NMR (125 MHz, $CDCl_3$): δ=58.92, 69.82, 70.51, 71.88, 72.39, 88.78, 89.14, 91.28, 107.98, 118.43, 120.12, 122.93, 128.38, 129.86, 131.61, 132.33, 138.83, 142.02, 152.51, 165.54 ppm.

v) HRMS: calculated: $C_{50}H_{61}NO_{13}$, 884.02, found: 885.50.

Example 2

Preparation of Fluorescent Material

Compound of formula 1 (3 mg) was taken in clean and dry glass vial. 2 ml of chloroform was added to it and gently heated to 35° C. to make the solution homogeneous. After cooling to 25° C. the solution was sprayed over the paper and dried in vacuum.

Example 2

Self-Erasable Writing Readable Only by Light Irradiation

Figure 7:
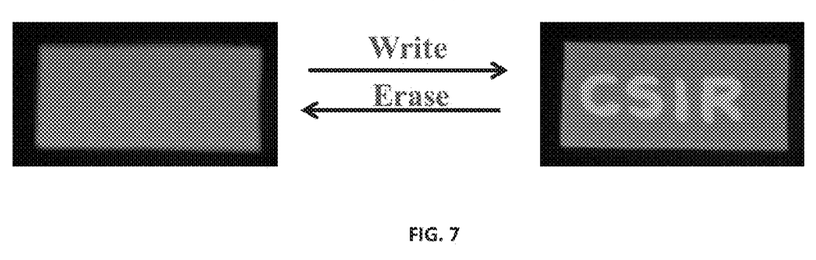
FIG. 7 shows the rewritable nature of fluorescent paper under UV light.

Fluorescent paper prepared from compound of formula 1 can be used for writing temporary data. The fluorescent paper is prepared by spraying chloroform solution of compound of formula 1 and drying under vacuum. The paper showed a blue fluorescence under UV light. When a selective part of the paper was sprayed with water, the sprayed region alone showed green fluorescence while the unsprayed part retains initial blue fluorescence. This exhibits the writable nature of fluorescent paper by water pen shown in FIG. 7.

Figure 8:
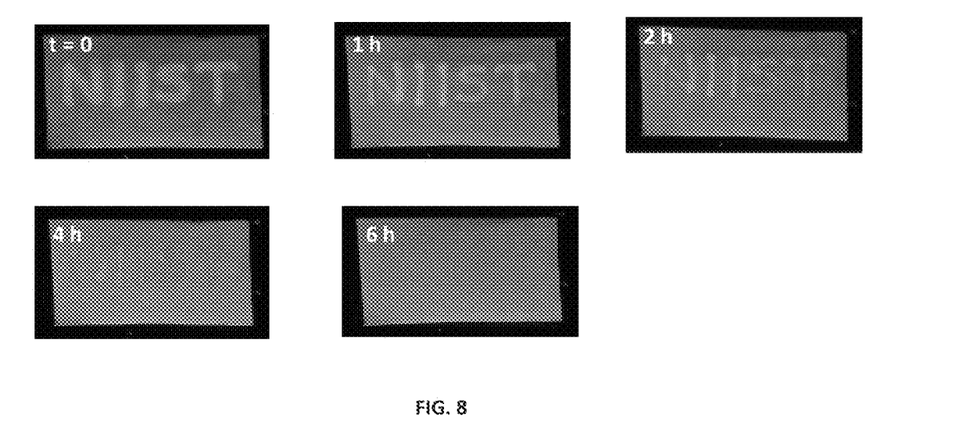
FIG. 8 shows the self-erasable images with time under UV light.

The data written over the fluorescent paper would be self-erased within 6 hours under normal condition or instantly by exposing to hot air. The paper was reused for repeated writing using water pen. The fluorescence intensity remains the same after several cycles. This exhibits the self-erasable and rewritable nature of the paper for several cycles, by retaining their intrinsic property as shown in FIG. 8.

The writing is not visible under normal day light. The information in the paper cannot be photocopied and the data will be visible only in the presence of ultraviolet light. For protecting secured data this invention can be used for temporary storing of information and images which will be revealed only under UV light temporarily for six hours.

Example 3

Security Label for Protecting Authenticity of Documents

Fluorescent mark made from compound of formula 1 can be used as security labels. Under ultraviolet light the fluorescent mark shows initially blue fluorescence and when water sprayed above or applied moisture the fluorescence color changes to green. The original blue fluorescence can be attained after six hours or instantly by exposing the coated paper to hot air under ultraviolet light. This technique finds application in protecting and detecting authenticity of important legal and secured documents such as visa.

Example 4

Process for the Prevention and Detection of Currency Counterfeit

Figure 9:
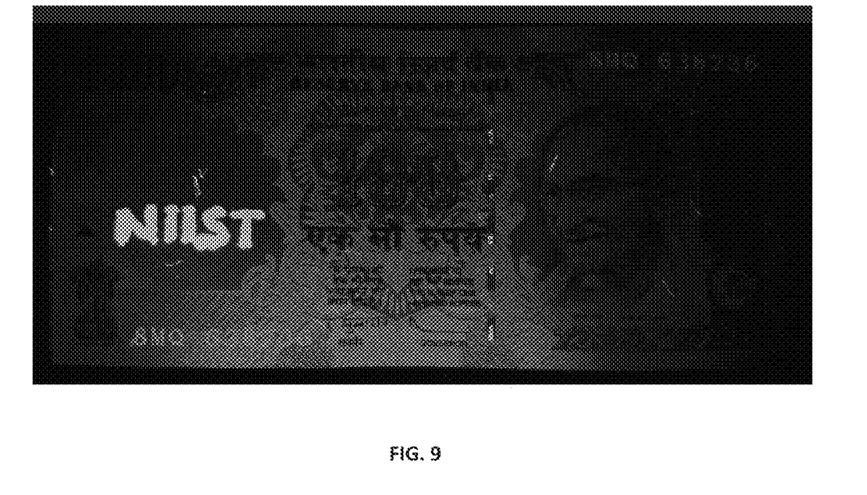
FIG. 9 shows the photograph of Indian currency under UV light having wave length 365 nm with letter "NIIST" written using chloroform solution of formula.
Figure 10:
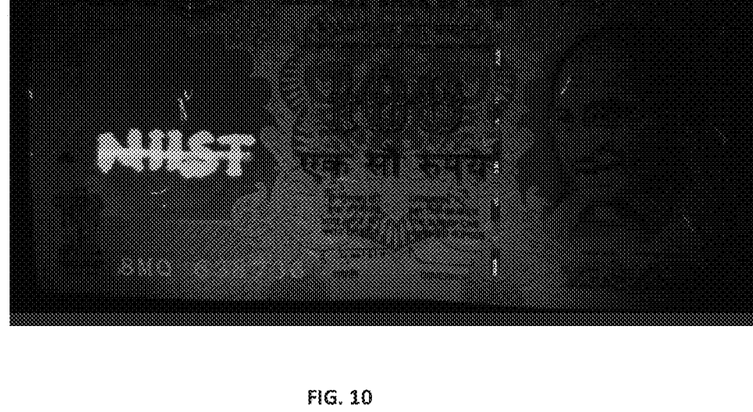
FIG. 10 shows the photograph of Indian currency under UV light (365 nm) after writing the letters "NIIST" and strike across by water pen.
Figure 11:
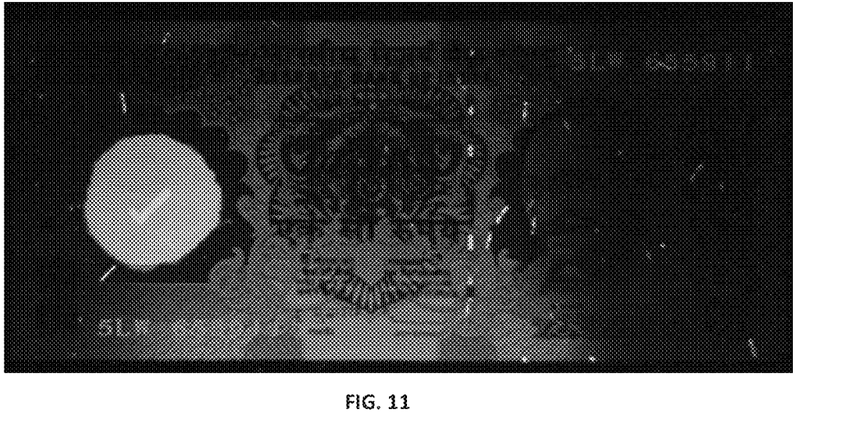
FIG. 11 shows the photograph of Indian currency under UV light (365 nm) coated with chloroform solution of formula 1 and above tick mark done using water pen.

The moisture responsive property of compound of formula 1 can be applied in currency counterfeit detection, alert and prevention. The procedure is outlined below. A solution of compound having compound 1 was prepared by dissolving 3 mg of the compound in 2 ml of chloroform followed by gentle heating to 35° C. Then the solution was used to write the letter "NIIST" using paint brush above currency bill and dried under vacuum. Initially the letters shows blue fluorescence under UV light as shown in FIG. 9. Using a water pen a strike mark is made over the letter "NIIST" which shows green fluorescence at the marked region (FIG. 10). The initial blue fluorescence can be attained instantly by exposing currency to hot air or kept at room temperature for six hours. The fluorescence intensity remains same after repeating this process for several cycles. In another experiment to detect counterfeit money chloroform solution of compound having formula 1 was coated over currency and dried under vacuum. The coated surface shows blue fluorescence initially. A tick mark was made above the currency using water pen then the marked region only changed to green fluorescence as shown in FIG. 11.

The fluorescent mark made from compound 1 showed very good reversibility, FIGS. 2A-B corresponding to the fluorescence spectral change when repeatedly sprayed with water and dried using hot air. The fluorescent intensity remains the same at their respective state after several cycles of treatment. This exhibits the excellent reversible nature of the fluorescence mark and retention of their inherent character.

ADVANTAGES OF THE INVENTION

The main advantages of the present system include:
1. Synthesis of novel fluorescent molecule having formula 1.
2. Compound having formula 1 coated over currency can be used for the detection, prevention and alert of fake money or documents.
3. Compound having formula 1 can be used as security labels for important documents which showed rapid response to the moisture.
4. The information stored in the fluorescent paper is invisible to eyes in normal a light and will be visible only under UV light with wave length 365 nm.
5. Self-erasable nature of fluorescent paper allows the data to store temporarily.
6. Water can be used as ink for writing fluorescent paper.
7. The fluorescent paper can be reused for several times by exposing to hot air or kept at room temperature for few hours.
8. Since the fluorescence color change is from blue to green, it can be easy visualized by using UV light.
9. Writings made above the fluorescent paper done by water pen makes friendly to environment.

We claim:
1. Compound of general formula 1

General Formula 1 wherein

R =

2. The compound of formula 1 as claimed in claim 1, wherein said compound is useful as fluorescent material for self-erasable writing, authentic security labeling, currency counterfeit prevention.

3. A process for the preparation of compound of general formula 1 comprising the steps of:
  i. refluxing compound 3 with compound 2 in tetrahydrofuran and triethylamine in the ratio ranging between 1:1 to 1:1.5 in the presence of catalyst at temperature in the range of 55 to 65° C. for period in the range of 11 to 13 h under argon atmosphere;

ii. cooling the reaction mixture as obtained in step (i) at temperature in the range of 25 to 30° C. followed by extracting using chloroform to obtain combined organic layer;
  iii. washing the combined organic layer as obtained in step (ii) with water, brine followed by drying over anhydrous sodium sulphate and purifying using column chromatography with 10% methanol-chloroform as eluent to obtain compound of general formula 1

General Formula 1 wherein

R =

4. The process as claimed in claim 3, wherein catalyst used in step (i) are 5 to 10 mol % Bis(triphenylphosphine)palladium(II) chloride [PdCl$_2$(PPh$_3$)$_2$] and 5 to 10 mol % Copper iodide (CuI).

5. The process as claimed in claim 3, wherein yield of the compound of general formula 1 is in the range of 72-75%.

* * * * *